Nov. 9, 1948.    G. RATHMAN    2,453,383

FLEXIBLE COUPLING

Filed Sept. 4, 1943

INVENTOR
Gilbert Rathman
BY
Warren S. Orton
ATTORNEY

Patented Nov. 9, 1948

2,453,383

UNITED STATES PATENT OFFICE 2,453,383

FLEXIBLE COUPLING

Gilbert Rathman, Union, N. J.

Application September 4, 1943, Serial No. 501,210

11 Claims. (Cl. 64—15)

The invention relates in general to an improvement in flexible couplings of the type in which power is transmitted between two rotors through the agency of a plurality of drivers, each of which includes a spirally wound spring carried by one of the rotors and intruded into a recess or socket provided therefore in the other rotor. The invention particularly relates to an improved form of driver and especially features a novel form of its spring elements.

The primary object of the invention is to provide a simplified and improved form of flexible driving connection between rotors which may have either a common axis of rotation or have their axes angularly disposed to each other; which will provide for any desired degree of flexibility in the driving connection by the substitution of one spring for another of different flexible characteristics; which will permit of a ready substitution of a fresh for a worn spring; which will automatically compensate itself for wear; which will maintain itself free from rattle even though worn; and which will provide for the placing of the spring under the tension for which that particular spring was intended and to provide for such preset degree of tension incidental to the assembly of the parts in their interdriving relation.

Another object of the invention incidental to the providing of an improved form of spring is a simplified technique for fabricating the spring.

Various other objects and advantages of the invention will be in part obvious from a consideration of the method features of the disclosure and from an inspection of the accompanying drawings and in part will be more fully set forth in the following particular description of one method of practicing the invention, and the invention also consists in certain new and novel modifications of the preferred method and other features of construction and combination of parts hereinafter set forth and claimed.

Figure 1:
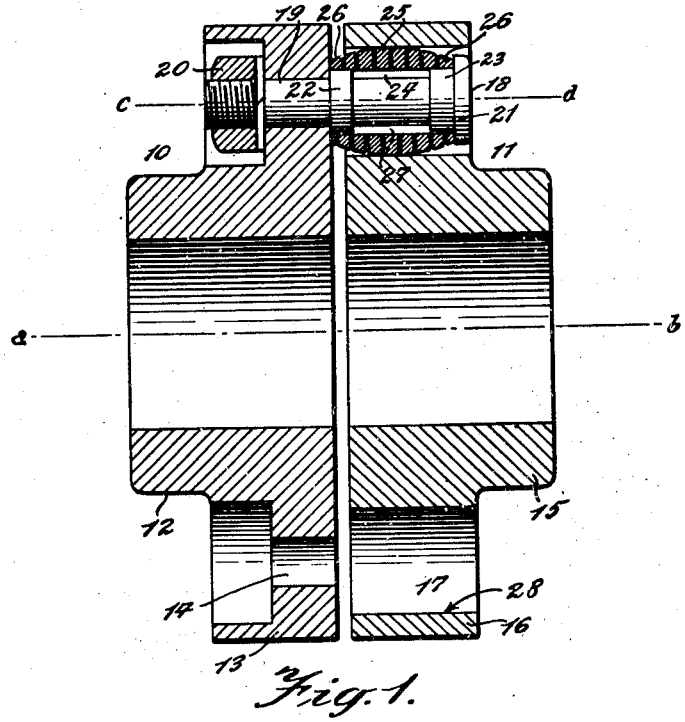
Figure 2:
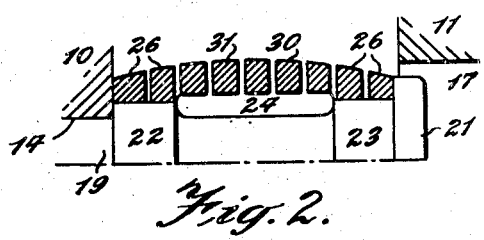

In the accompanying drawing:

Fig. 1 is an axial sectional view through a flexible connection constituting a preferred embodiment of the invention with one of the drivers shown in axial section and another driver omitted from the space intended to accommodate it so as to show details of the parts on which the omitted driver is mounted; and Fig. 2 is an axial sectional view similar to the upper portion of Fig. 1 above the axis, showing a slightly modified form of spring in distended position before it is intruded into its associated socket.

In the drawings and referring first to the showing in Fig. 1, there is disclosed a pair of disc-like rotors 10 and 11 mounted on shafts or otherwise journalled for rotary movement about an axis of rotation indicated by the line a—b. One of these rotors can be assumed to be the driving member and the other the driven member of the coupling. While these rotors are described as turning about a single axis, it is within the scope of the disclosure to have each rotor turn about its own axis and these axes may be disposed at an angle to each other as may be permitted by the driving connection hereinafter described.

The rotor 10 is provided with a hub 12 and with an outstanding flange or disc 13 at the inner end of the hub. The flange is provided with a plurality of bolt holes 14, there being six in one physical embodiment of the invention, and two of which are shown in Fig. 1. Similarly, the rotor 11 is provided with a hub 15 and an outstanding flange or disc 16 at its inner end facing and disposed close to the flange 13. The flange 16 is provided with a plurality of cylindrical recesses or sockets 17, one for each of the bolt holes 14 and each in axial alignment with its associated bolt hole. Mounted in each of the bolt holes 14 and disposed for intrusion into its associated socket is a driver 18. The drivers and sockets are spaced about the axis of rotation equidistantly and extend parallel thereto and equally spaced therefrom. It is understood that as these drivers are of identical construction the detailed description of any one will be sufficient for the others.

Referring to the showing at the top of Fig. 1, the driver includes pin-like support 19 with one end thereof mounted in the bolt hole and secured therein by a nut 20 engaging the threaded end of the support. The support projects from the rotor 10 and is provided at the end intruded into the recess with a stop collar 21. The projecting portion of the support is provided with a pair of spaced apart bearings 22 and 23; bearing 22 abutting the adjacent face of the rotor 10, and bearing 23 being adjacent the stop collar. The parts are so arranged that a long, shallow annular clearance 24 is formed between these bearings. A double conical, helically wound spring 25 encircles the projecting portion of the support and snugly fits between the stop collar and the inner face of the rotor 10. One or more of the turns 26 at each end of the spring snugly engage the bearings 22 and 23 so that the spring is at all times held concentric with the axis c—d of the driver.

In the form of the spring shown in Fig. 1, the spring is barrel-shaped when in its normal, distended position, that is, before it is intruded into its socket. The bore 27 through the spring is cylindrical and normally, that is, before the driver is inserted on the support, has a diameter slightly less than the diameter of the bearings on which it is located. Except for the curvature imposed by the barrel-like outer perimeter, the coils of the spring are substantially rectangular in cross section, with the turns of the spring having their greatest depth of axial cross section of material at the midlength of the spring and progressively reducing in such depth of material toward opposite ends of the spring and with adjacent sides relatively close together but, of course, not touching before the driver is intruded into its associated socket. For the purpose of facilitating a smooth entrance of the spring into its associated socket the outer faces of each coil forming the intruded end merge without break into the outer face of its next adjacent coil to form an ovoid. Considered as a whole the outer faces of the coils coact to form a gentle and continuous curve from end to end in all axial cross sections through the spring.

In assembling the parts shown in Fig. 1, it will be understood that the spring selected from a stock of such springs differing from each other in resiliency and which spring is selected in view of the particular torque which the coupling is designed to transmit, is slipped on to the support before it is mounted in its carrying rotor. The threaded end of the support is then inserted into the rotor 10 and nut 20 tightened firmly into position to draw bearing 22 snugly into engagement with the rotor 10 and incidentally foreshortening the spring and thus placing it under axially directed tension. This, of course, tends to bring the several turns of the spring more closely together than they were prior to being so compressed. When all of the drivers have been thus mounted on their carrying rotor, they are inserted into their several associated sockets in the rotor 11 by bringing the rotors into their driving relation as shown in Fig. 1. It will be understood that the diameter of the socket is slightly less than the maximum diameter of the spring at its midportion and is slightly greater than the diameter of the spring at its intruding end and greater than the diameter of the stop collar. It is understood that there is no intent to transmit power thru the stop collar; there must be some clearance between the stop collar and the rotor in which it is intruded. As the springs are inserted into their associated sockets, the cylindrical walls 28 outlining the sockets will engage the midportion of the spring distorting the same radially inwardly and thus move the midturns toward or into the annular clearance 24 with, of course, some incidental rotation of the turns of the spring to compensate for the decrease in the maximum diameter of the spring. The advance end of the spring being conical it can nose itself into the recess and progressively engage the turns of the spring. It will be thus seen that the spring is compressed axially and that the middle portion of the spring is compressed radially under the load imposed thereon by the rotating rotors. With increase of load, the springs tend to become more and more cylindrical in their mid-portion with some increase in the number of turns of the spring involved in this constriction of maximum diameter.

Referring to the modified form of spring shown in Fig. 2, it will be understood that the spring 30 corresponds in all material respects to the spring described in connection with Fig. 1 except that the turns 31 in the midportion opposite the clearance 24 have been cut back so as to increase the depth of the clearance. Differently defined, it will be understood that the bore through the spring is of greater diameter at its midlength than at its ends which are cylindrical. It is suggested in this case that the annular clearance 24 may be omitted, and the entire portion of the support be cylindrical and of the same diameter as the bearings 22 and 23. It is appreciated in the case where the midlength turns are thus cut back that these turns are of less cross sectional area of material and are thus more flexible than the more rugged turns shown in the Fig. 1 disclosure. The Fig. 2 form of spring is suggested for use in place of the spring shown in Fig. 1 where a high degree of rotative flexibility between the rotors is desired.

I claim:

1. A flexible coupling including two rotors mounted for rotary movement each about its own axis and organized to have relative axial movement to and from an interdriving relation, one of the rotors provided with a driver projecting therefrom and the other provided with a socket for receiving the driver and acting to drive one rotor from the other, said driver including a pin-like support projecting from its associated rotor and provided at its outer end with a stop collar, said support provided adjacent the stop collar and adjacent its associated rotor with a pair of cylindrical bearings and providing therebetween a waist-forming portion having a diameter less than the diameter of the bearings to provide within the axially projected outline of the bearings an annular clearance space, a coiled spring of barrel-like form held in place under axially directed tension, having its opposite ends at all times snugly encircling the bearings, having its midlength portion of maximum diameter distorted from its original configuration radially inward toward said clearance when the driver is intruded into the socket, and the turns of said spring being of different cross sectional area of material considered axially of the spring at the end turns engaging the bearings than at the turns therebetween which encircle the clearance.

2. A flexible coupling including two rotors mounted for rotary movement each about its own axis, one of the rotors provided with a driver projecting therefrom and the other provided with a socket for receiving the driver and acting to drive one rotor from the other, said driver including a pin-like support projecting from its associated rotor and provided at its outer end with a stop collar, said support provided adjacent the stop collar and adjacent its associated rotor with a pair of cylindrical bearings and providing therebetween an annular clearance space of less diameter than the bearings, a coiled spring compressed between said associated rotor and the collar, having its opposite ends at all times snugly encircling the bearings, and having its midlength portion of maximum diameter distorted from its original configuration radially inward toward said clearance when the driver is intruded into the socket.

3. A driver for flexibly connecting two rotors to drive one from the other, including a pin-like support adapted to be carried by one of the rotors and intruded into a recess in the other rotor, a helical spring of substantially barrel-like form encircling the support, the coils at opposite ends snugly engaging the support and the coils therebetween adapted to be contracted towards the support when in operative driving status intruded into the recess, the coils of the spring being substantially rectangular in cross section and with adjacent sides thereof parallel to each other and normally spaced apart at least slightly, and the coils forming the midlength portion of the spring being of less cross sectional area of material considered axially of the spring than one of the end coils of the spring and of less internal diameter than the portion of the support encircled thereby.

4. In a flexible coupling, the combination of a driving member and a driven member and driving connections therebetween, said connections each including a one-piece double conical coiled spring normally of maximum external diameter adjacent its midlength and its external diameter progressively decreasing from said midlength of maximum diameter towards its opposite ends, said spring provided with an axially extending bore, at least opposite end portions of which are of cylindrical form and coaxially related, the midlength portion of said bore being of uniform diameter and of greater diameter than said end portions, and the coils forming said midlength portion being of less cross sectional area of material considered axially of the spring and thus more flexible than the portion of the spring which forms one of its ends.

5. A spring including closely positioned coils forming a substantially cylindrical bore of slightly less diameter at its ends than in the length therebetween, the coils forming the length therebetween being of the same internal diameter, said spring considered exteriorly being of a barrel-like form whose ends are in planes perpendicular to the axis of the spring and whose side defines a substantially smooth surface generated by a convex elliptical line described about said axis and forming substantially a prolate ellipsoid.

6. In a device of the class described, the combination of two rotors adapted to be moved axially from an unclutched into a clutched interdriving relation, one of the members provided with a plurality of pins and the other member provided with a plurality of recesses for receiving the pins, means to provide a resilient driving connection between the several pins and said other members and to cushion the interdriving connection of the rotors as they are moved into their driving relation, said means providing in connection with each pin a barrel-like helically wound coiled spring, each spring initially being under axial load and each spring as it moves into its associated recess deforming progressively from a mid-coil axially therefrom in both directions and constricting to fit in the recess under radially imposed load, said springs at their intruding ends being of conical form to assist in the interengaging of the rotors without shock with the adjacent sides of the turns of the spring being closely related and substantially parallel to each other when so disposed under axially directed load and said coils disposed to wind down to reduce the clearance between adjacent turns as the rotors are moved into their inter-driving relation the bores of said springs being cylindrical from end to end, and the turns of each spring being of maximum radial depth of material adjacent the midlength of the associated spring and reducing in radial depth of material from said maximum depth towards one end of the associated spring.

7. A flexible coupling including a pin-like support provided at opposite ends with enlarged cylindrical bearings and the portion of the support between the bearings having a diameter less than that of the bearings to provide a clearance considered axially between the bearings, stop members located outwardly beyond said bearings and a coiled spring of greater external diameter adjacent its midlength than its ends, fitted axially under load between the stop members, having its end portions snugly engaging respectively the cylindrical bearings and the coils of the springs midlength thereof and between said end portions having internal diameters greater than the said portion of the support of less diameter than the bearings encircled thereby, whereby said midlength coils are free to wind down into said clearance.

8. A flexible coupling including two rotors mounted for rotary movement about a common axis and disposed to move axially relative to each other to and from an interdriving relation, one of the rotors provided with a cylindrical recess spaced from and parallel to said axis and the other provided with a driver projecting therefrom and adapted to be intruded into the recess to drive one rotor from the other, said driver including a pin-like support projecting rigidly from said other rotor and provided at its outer end with a stop collar of less diameter than the recess in which it is intruded, a helically wound spring encircling the support, at all times under axially directed tension, bearing at one end against the stop collar and at its other end bearing against said other rotor, said spring being of barrel-like form with its maximum external diameter adjacent its midlength and progressively decreasing therefrom towards its opposite ends, and the turns of said spring being of greatest depth of axial cross section of the material adjacent the midlength of the spring and progressively reducing in depth of material towards opposite ends of the spring, said opposite ends at all times bearing on and snugly engaging the support, said recess having a diameter slightly less than the maximum diameter of the spring when the driver is removed from the recess and greater than the diameter of the spring at the end designed to be intruded into the recess whereby the advanced end of the spring forms a wedge having a smooth continuous surface of frusto-conical form forming a wedge to facilitate an easy intrusion of the driver into the recess and the wedging of the spring with the recess acting on the coils at the midlength of the spring to contract them radially thereby placing the spring as a whole under greater tension when in driving relation in the recess than when free of the recess.

9. A flexible coupling including two discs facing each other for rotary movement about a common axis and organized to be moved axially to and from an interengaging clutching relation, one of the discs provided with a cylindrical socket offset from and extending parallel to said axis, the other disc provided with a driver intruded into the socket for driving one disc from the other, said driver including a pin-like support extending rigidly from its associated disc, a single double conical helically wound metallic spring encircling and carried by the support and located for the most part within the outlines of the socket, when in interdriving position, said spring normally being loaded in an axial direction and having its maximum external dameter adjacent its midlength and with its external diameter progressively decreasing therefrom toward its opposite ends to give the spring a barrel-like form when free from its associated socket, the outer faces of the coils of the spring defining a curve in all axial cross sections of the spring, said spring in the region of its maximum diameter having its maximum cross section of material and being radially distorted inwardly from its initial configuration when intruded into its socket, and so held in such distorted position while in its driving relation by its engagement with the wall of the socket in which the driver is intruded and the spring on opposite sides of said region of maximum cross section of material progressively decreasing in such cross section of material towards the opposite ends of the spring.

10. A driver for flexibly connecting two rotors to drive one from the other, including a pin-like support adapted to be carried by one of the rotors and intruded into a recess in the other rotor, a helical spring whose bore is of uniform cross section from end to end encircling the support at all times under axial load even when the rotors are disconnected from each other, the coils at opposite ends snugly engaging the support and the coils therebetween being normally spaced from the support and adapted to be contracted towards the support when moved from its inoperative into its operative driving status intruded into the recess and the coils of the spring being substantially rectangular in cross section and with adjacent sides thereof parallel to each other and normally spaced apart at least slightly and said coils defining a structure opposite ends of which are of substantially frusto-conical design, gradually tapering in external diameter towards the ends of least diameter.

11. A coiled spring of barrel-like form and provided with a bore extending axially therethrough and defining two cylindrical surfaces, opposite ends of the bore defining opposite ends of one of said cylindrical surfaces, the midportion between said opposite ends being formed of spiral coils whose interior surfaces define the other cylinder, said other cylinder having a diameter greater than the diameter of the cylindrical surface defined by the end coils and having a relatively higher degree of flexibility than the coils which form the ends and said midportion coils capable of being reduced in external diameter when squeezed inwardly to reduce the diameter of the spring bore at its midportion and the portion of the spring forming one end thereof being more rigid than the midportion and thus tending to resist distortion.

GILBERT RATHMAN.

REFERENCES CITED

The following references are of record in the file of this patent:

UNITED STATES PATENTS

| Number | Name | Date |
| --- | --- | --- |
| 333,983 | Vose | Jan. 5, 1886 |
| 1,264,742 | Aldrich | Apr. 30, 1918 |
| 1,642,907 | Sundh | Sept. 20, 1927 |
| 1,675,760 | Manzel | July 3, 1928 |
| 1,760,492 | Hall | May 27, 1930 |

FOREIGN PATENTS

| Number | Country | Date |
| --- | --- | --- |
| 25,022/35 | Australia | Sept. 7, 1936 |
| 66,327 | Sweden | Nov. 6, 1928 |
| 771,366 | France | July 23, 1934 |